Sept. 5, 1950 W. T. SMITH 2,521,262
ELECTRIC MOTOR-DRIVEN LAWN MOWER
Filed Sept. 25, 1947 7 Sheets-Sheet 4

INVENTOR.
William T. Smith,
BY Victor J. Evans & Co.
ATTORNEYS

Sept. 5, 1950    W. T. SMITH    2,521,262
ELECTRIC MOTOR-DRIVEN LAWN MOWER

Filed Sept. 25, 1947    7 Sheets-Sheet 6

INVENTOR.
William T. Smith,
BY Victor J. Evans & Co.
ATTORNEYS

Sept. 5, 1950 W. T. SMITH 2,521,262
ELECTRIC MOTOR-DRIVEN LAWN MOWER
Filed Sept. 25, 1947 7 Sheets-Sheet 7

INVENTOR
William T. Smith,
BY Victor J. Evans & Co.
ATTORNEYS

Patented Sept. 5, 1950

2,521,262

UNITED STATES PATENT OFFICE 2,521,262

ELECTRIC MOTOR-DRIVEN LAWN MOWER

William T. Smith, St. Louis, Mo.

Application September 25, 1947, Serial No. 776,048

10 Claims. (Cl. 56—26)

1

This invention relates to an electric lawn mower wherein a motor is incorporated in a cutter carrying cylinder and the driving wheels are geared thereto, and in particular remote control means for an electrically actuated lawn mower with steering and cable guiding means controlled thereby and with means for stopping the operating instrumentalities when a stone or other obstruction is caught between the cutters and a blade coacting therewith.

The purpose of this invention is to provide means for steering and operating a lawn mower from a remote point.

Electrically operated lawn mowers require current supply or feed cables and because of the unevenness of terrain and obstructions such as plants, flower beds, fences and the like it is necessary to have the mower under manual control at all times. However in parks, golf courses, cemeteries, and even on residence lawns the mower may be set to follow a straight course and with slight manual control to keep it on a course and guide it around plants and the like large areas may be cut with the operator remaining in a control station, on a truck, or at a convenient remote point.

With this thought in mind this invention includes mechanically actuated instrumentalities in an electric lawn mower wherein the mower may be steered, operated, and a cable carrying arm thereon switched from one side to another from a remote point, and wherein the mower will automatically stop when the cutting elements strike an obstruction.

The object of this invention is to provide means for incorporating control devices in an electrically actuated lawn mower wherein the mower may be operated by remote control.

Another object of the invention is to provide means for stopping and starting the driving wheels of an electrically operated mower independently so that the mower may be steered from a remote point.

Another object of the invention is to provide means for carrying an electric feed cable of electric lawn mowers wherein the cable may be switched from side to side to prevent the mower running over the cable.

Another object of the invention is to provide mechanically actuating parts for breaking the circuit of an electrically operated lawn mower as cutting elements thereof engage an obstruction.

A further object of the invention is to provide remote control means for electrically operated lawn mowers which is of simple and economical construction.

With these and other objects and advantages in view the invention consists of the new and novel combination, construction, and arrangement of parts as more fully hereinafter described, set forth in the claims appended hereto, and disclosed in the accompanying drawings forming part hereof, wherein:

Referring now to the drawings wherein like reference characters indicate corresponding parts the remote control electric lawn mower of this invention includes a rectangular-shaped casing 40 with the lower surface and front end open, a cutter cylinder 41, driving wheels 42 and 43, casters 44 and 45, and a control and operating cable 46.

Figure 1:
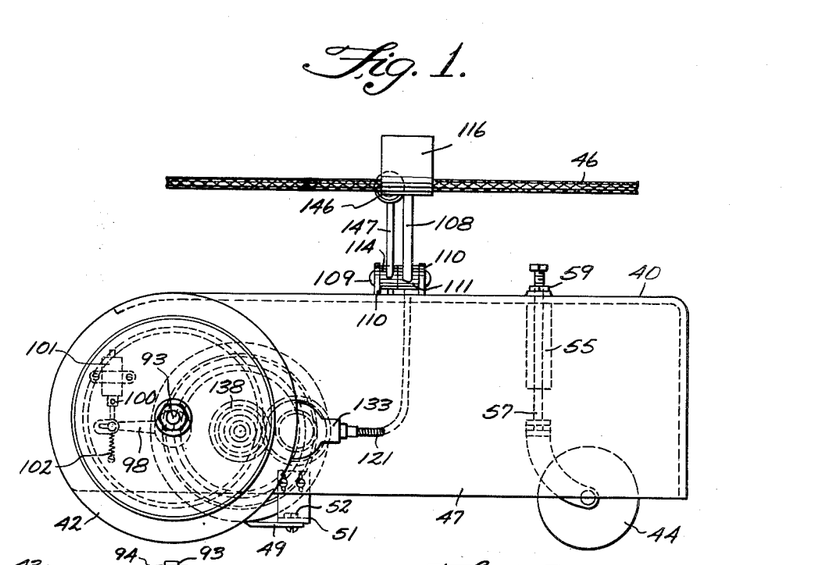
Figure 1 is a view showing a side elevation of the mower.
Figure 2:
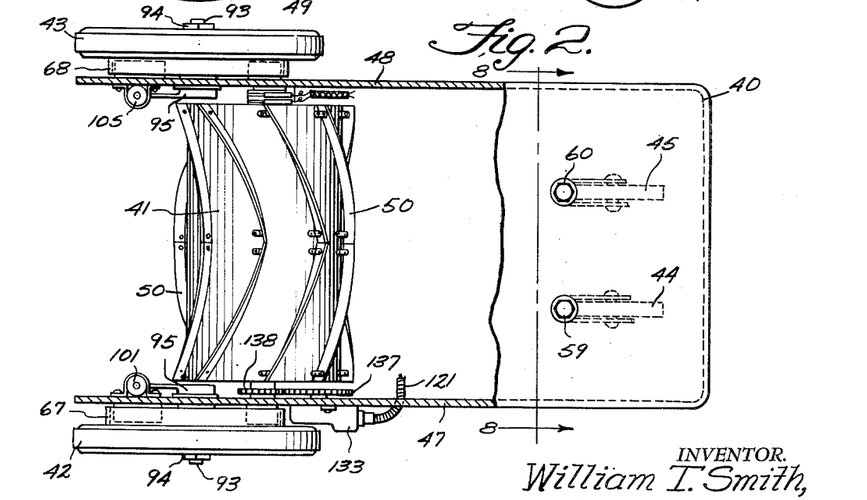
Figure 2 is a plan view of the mower with part broken away showing the cutter carrying cylinder.
Figure 3:
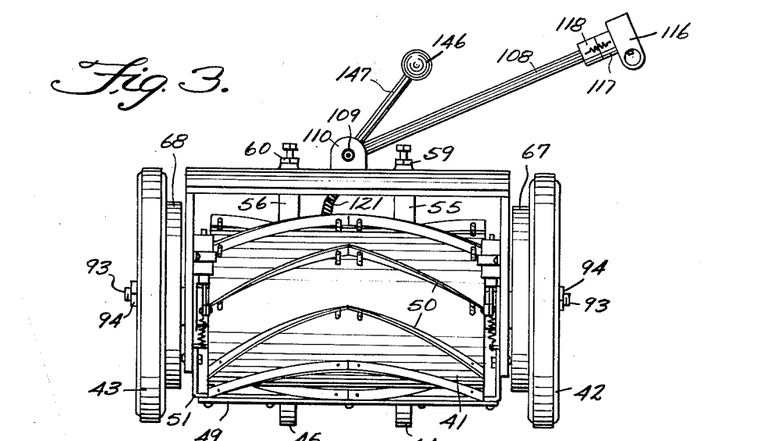
Figure 3 is a view showing a front elevation of the mower.
Figure 4:
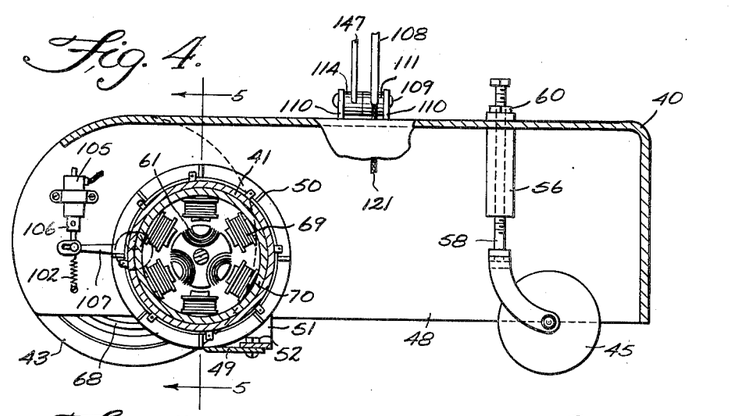
Figure 4 is a longitudinal section through the mower taken on line 4—4 of Figure 3 with part broken away to show the base of the cable carrying arm.
Figures 8, 9, 10, 11, 12:
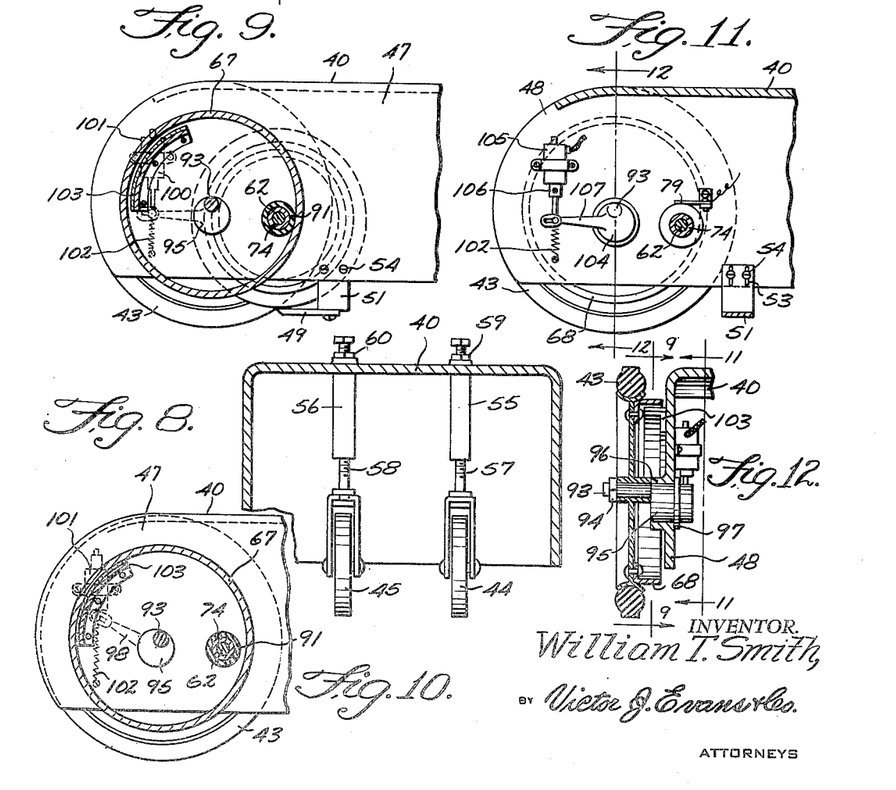
Figure 8 is a cross section through the mower taken on line 8—8 of Figure 2.
Figure 9 is a section through a brake drum of one of the driving wheels with parts broken away showing the parts in the operating position, taken on line 9—9 of Figure 12.
Figure 10 is a similar view showing the parts in the braking position.
Figure 11 is a detail showing a section through a forward corner of the mower casing with parts broken away illustrating the wheel actuating solenoid, and taken on line 11—11 of Figure 12.
Figure 12 is also a section through a corner of the mower casing and one of the driving wheels, being taken on line 12—12 of Figure 11.

The casing 40 is provided with side walls 47 and 48 in which the cutter cylinder and driving wheels are mounted and a cutting blade 49 which coacts with the cutters 50 on the cylinder 41 is mounted on a bracket 51 by bolts 52 and the ends of the bracket are adjustably attached through slotted openings 53 to the side walls 47 and 48 by screws 54. The casters 44 and 45 are adjustably mounted in sleeves 55 and 56 in the casing by bolts 57 and 58 with lock nuts 59 and 60 as shown in Figures 4 and 8.

Figure 5:
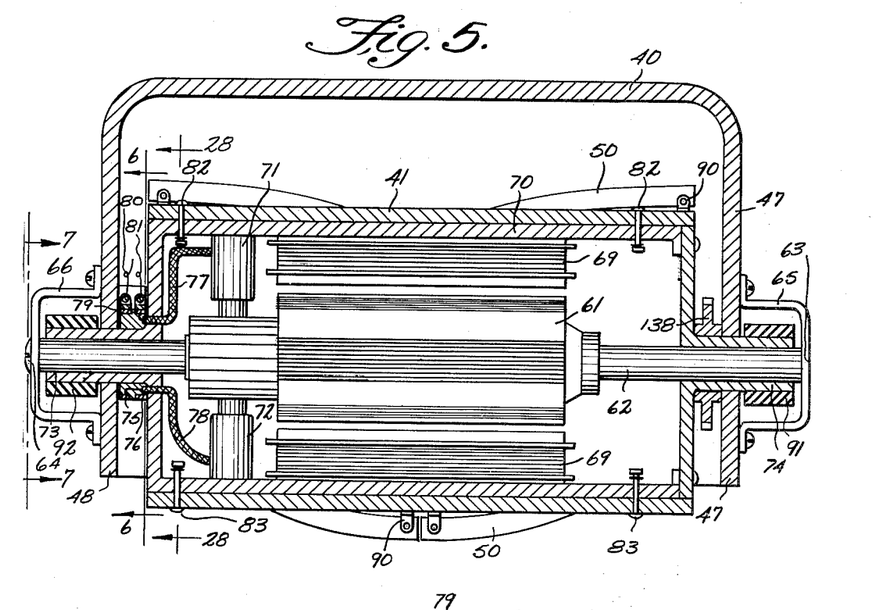
Figure 5 is a cross section through the cutter cylinder of the mower taken on line 5—5 of Figure 4.

The mower is driven by a motor in the cylinder 41 which comprises a stationary armature 61 on a stationary shaft 62, that, as illustrated in Figure 5 is held by screws 63 and 64 in brackets 65 and 66 on the side walls 47 and 48 of the casing 40. The brackets 65 and 66 extend into hubs 67 and 68 of the driving wheels 42 and 43. The field 69 of the motor is mounted in an inner cylinder 70 which also carries the brushes 71 and 72, and the ends of the cylinder 70 are provided with hubs 73 and 74 through which it is journaled on the armature shaft. Contact rings 75 and 76 are mounted on and insulated from the hub 73 and the rings are connected by wires 77 and 78 to the motor and by brushes 79 to wires 80 and 81 of the current supply circuit.

Figure 28:
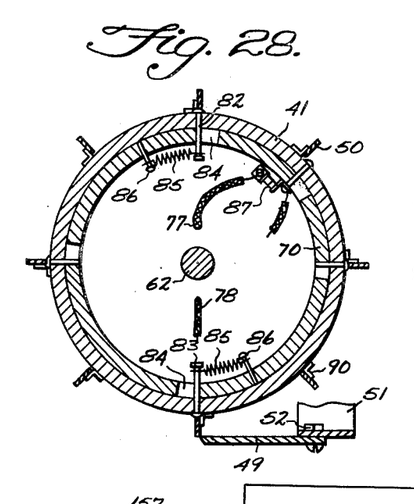
Figure 28 is a cross section through the cutter carrying cylinder taken on line 28—28 of Figure 5 showing the parts in the operative position.
Figure 29:
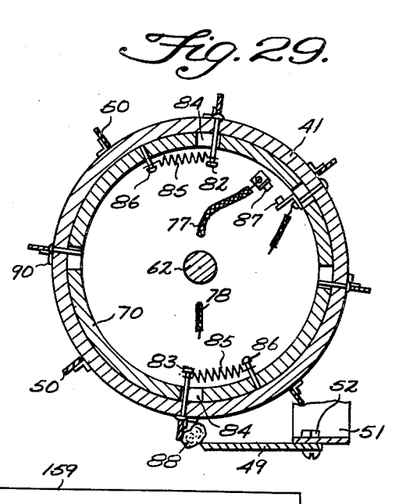
Figure 29 is a similar section showing the parts actuated by a stone between the cutters and blade to open contacts in the cylinder to break the circuit to the mower driving motor.

The cutter cylinder 41 is slidably mounted on the inner cylinder 70 and is provided with bolts 82 and 83 that extend through slots 84 in the inner cylinder. The inner ends of the bolts 82 are connected to springs 85 and the opposite ends of the springs are connected to studs 86 in the inner cylinders 70, and it will be noted that the springs 85 will resiliently hold the cylinders in operative relation with contacts 87 in engagement as shown in Figure 28, whereas should a stone 88 work in between the cutters and blade 49 as illustrated in Figure 29 the springs will yield and the contacts 87 will open. The contacts 87 are positioned in the wire 80 that connects the motor in the main circuit through a switch 89, and the cutters 50 are attached to the cylinder by clips 90.

Figures 6, 7, 13:
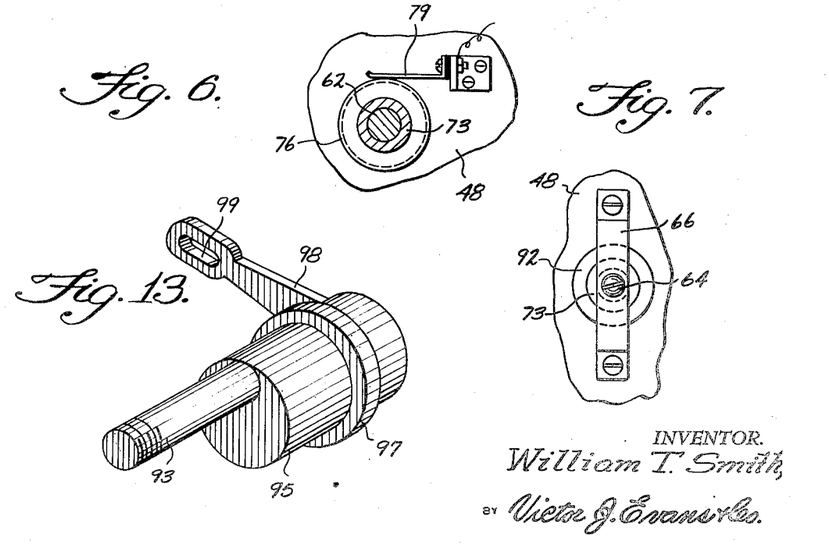
Figure 6 is a detail showing a section on line 6—6 of Figure 5 illustrating the rotary current supply contact brushes.
Figure 7 is a detail taken on line 7—7 of Figure 5 showing the brackets at the ends of the cutter cylinder shaft.
Figure 13 is a detail showing the solenoid actuated wheel mounting eccentric.

The outer ends of the hubs 73 and 74 of the inner cylinder 70 are provided with friction driving bushings 91 and 92 that extend into and are positioned to engage the inner surfaces of the hubs 67 and 68 of the driving wheels 42 and 43. The driving wheels are rotatably mounted on pins 93 on which they are freely held by nuts 94 and the pins are eccentrically positioned on stub shafts 95 that are journalled in hubs 96 in the side plates as shown in Figure 12. The stub shafts are formed as illustrated in Figure 13 and have collars 97 thereon with arms 98 extending from the ends beyond the collars. The arms are connected through slots 99 in the outer ends thereof to cores 100 of solenoids 101, on one side and to springs 102 on the other wherein as the solenoids are energized the arms are pulled upward and when the solenoids are deenergized the springs pull the arms downward. The movement of the wheels is illustrated in Figures 9, 10 and 11. The parts are shown in the operative position in Figure 9 wherein the bushing 91 is in engagement with the hub 67 and the wheel is positioned so that the hub is spaced from the brake shoe 103, and it will be noted in Figure 10 that as the arm is drawn upward by the solenoid the eccentric moves the pin 93 and wheel forward so that the drum or hub is spaced from the bushing 91 at one side and in engagement with the brake shoe on the other. With both of the driving wheels mounted in this manner either wheel may be stopped and started independently and as stopping one wheel causes the mower to turn toward that side the mower may readily be steered from a remote point. As shown in the wiring diagram the wheel on the opposite side may also be mounted on a stub shaft 104 and controlled by a solenoid 105 through a core 106 and an arm 107.

Figures 17, 18, 19, 20, 21, 22, 23:
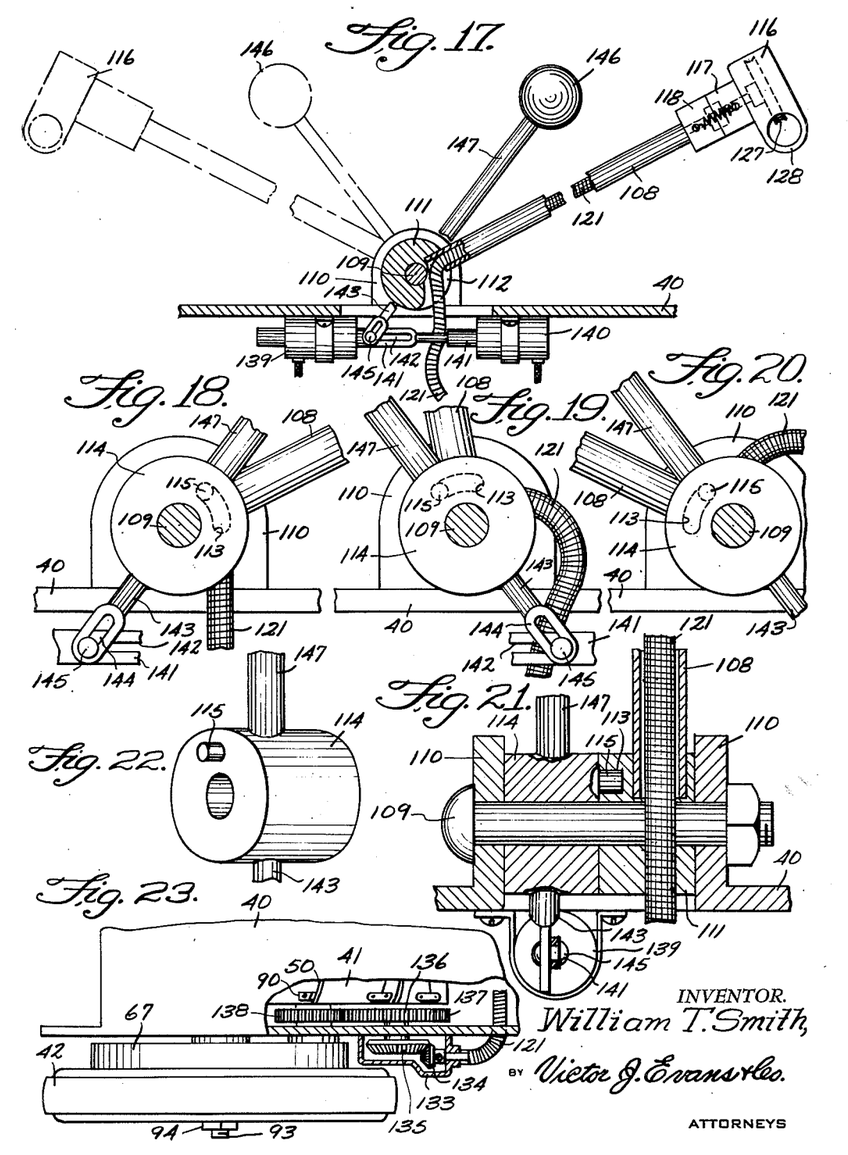
Figure 17 is a sectional detail taken on line 17—17 of Figure 1 with parts broken away, illustrating the operation of the cable carrying arm.
Figure 18 is a similar view on an enlarged scale with parts broken away showing the arm extending toward one side of the mower as shown in Figure 17.
Figure 19 is a similar view showing the parts partly moved toward the opposite side of the mower.
Figure 20 is also a similar view showing the parts moved all of the way to the said opposite side wherein the movement has been completed by a counterweight.
Figure 21 is a cross section through the hub of the cable carrying arm taken on line 21—21 of Figure 17.
Figure 22 is a detail showing the hub of the cable carrying arm, illustrating the section thereof carrying the counterweight.
Figure 23 is a plan view of one corner of the mower with parts broken away showing actuating means of a flexible cable that extends through the cable carrying arm to drive the cable through the outer end of the arm synchronizing the travel of the cable with the travel of the mower.

The operating cable 46 is carried on the mower by an arm 108 which is pivotally mounted on a bolt 109 that is held in ears 110 on the upper surface of the casing as illustrated in Figures 3 and 17 to 23 inclusive. The arm 108 is formed with a tube and the inner end is held in a hub 111 having a recess 112 in one side and an arcuate slot 113 in the end. Another hub 114 is also mounted on the bolt 109 and at the end of the hub 114 is a pin 115 as illustrated in Figure 22, which extends into the arcuate slot 113 in the end of the hub 111.

Figures 16, 24, 25, 26, 27:
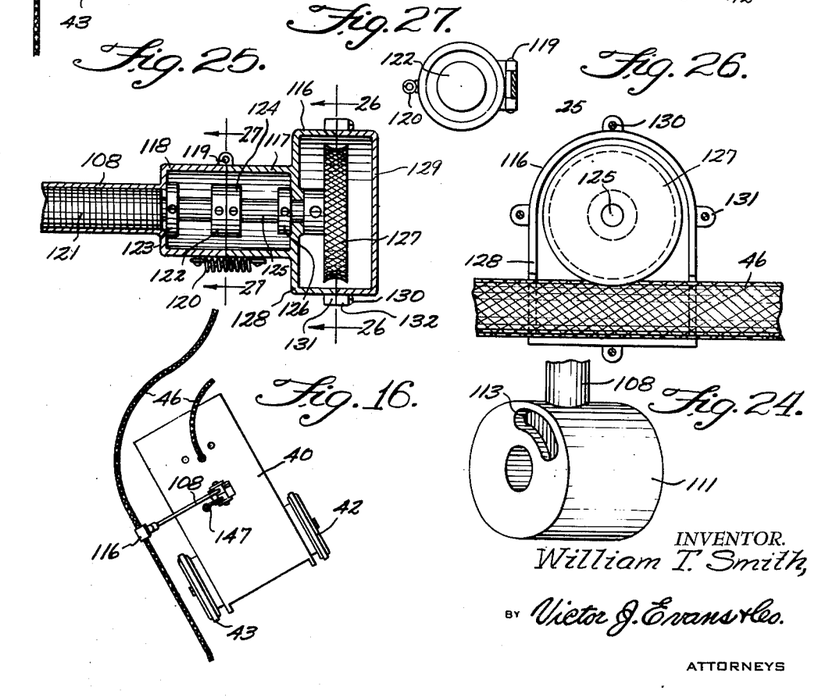
Figure 16 is also a similar view showing the positions of the cable with the mower turning.
Figure 24 is a detail showing the hub of the cable carrying arm through which the flexible cable extends.
Figure 25 is a longitudinal section through the housing at the outer end of the cable carrying arm showing a friction clutch therein.
Figure 26 is a section on line 26—26 of Figure 25 showing a knurled cable driving wheel in the casing.
Figure 27 is a section taken on line 27—27 of Figure 25.

At the outer end of the arm 108 is a housing 116 having a tubular hub 117 at one side and a tubular cap 118 on the end of the arm 108 is hinged to the hub 117 by a pin 119 at one side and resiliently held on the other side by a spring 120 as shown in Figure 25. A flexible shaft 121 extends through the arm 108 and on the upper end thereof is a flange 122 the face of which is flush with the end of the cap 118. The shaft is held in this position by a set collar 123 which may be adjusted to hold the face of the flange 122 against the face of a similar flange 124 on a shaft 125 that is journaled in the housing 116 and also provided with a set collar 126, and on the outer end of the shaft 125 is a knurled wheel 127 that frictionally engages the cable 46 wherein the cable will travel through the end 128 of the housing. The housing 116 is provided with an outer section 129 that is held thereto by bolts 130 in ears 131 and 132.

The flexible shaft 121 extends downward through the arm 108 and through the hub 111 as shown in Figures 17 and 21, to the inside of the casing 40, and from the interior of the casing through the side wall 47 thereof to a gear housing 133. A bevel gear 134 is provided on the end of the shaft which meshes with a bevel gear 135 on a shaft 136, and on the inner end of the shaft 136 is a gear 137 that meshes with a gear 138 on the hub 74 of the inner cylinder 70 which carries the fields of the motor. As the motor rotates the gears will turn the flexible shaft and the shaft will rotate the knurled wheel 127 which will drive the operating cable through the outer end of the arm 108.

In order to facilitate handling the cable as the mower turns means is provided for throwing the arm 108 from one side of the mower to the other and the arm actuating means is in series with the brake mechanism for starting and stopping the driving wheels. As one of the driving wheels is stopped the arm 108 moves to the opposite side of the mower so that it will throw the cable to the far side of the turn.

Figure 14:
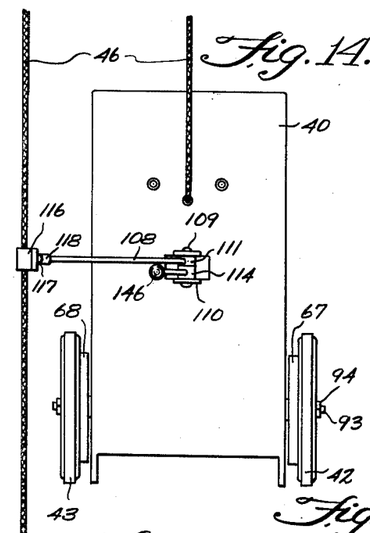
Figure 14 is a plan view of the mower showing the cable carrying arm on one side thereof.
Figure 15:
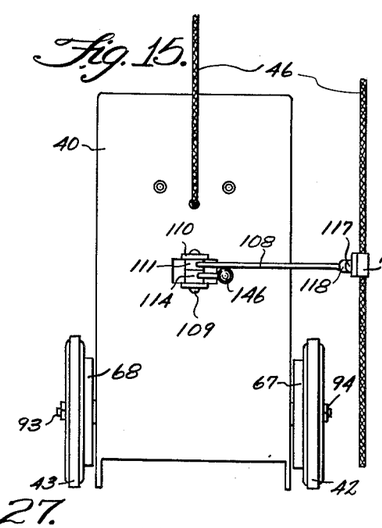
Figure 15 is a similar view showing the arm on the opposite side of the mower.

To accomplish this solenoids 139 and 140 are provided under the upper surface of the casing and a core 141 thereof with a slot 142 therein is positioned with the opposite ends in the solenoids. The core is connected to the hub 114 on the bolt 109 through an arm 143, also having a slot 144 therein, with a pin 145, and it will be noted in Figures 17 to 20 that as one solenoid is energized it will draw the arm 143 across the center moving a weight 146 on a rod 147 extending upward from the hub 114, across the center and as the weight passes over the center it will continue to pass from the position shown in full lines in Figure 17 to the position shown in dotted lines thereby throwing the arm 108 carrying the cable from one side of the machine to the other, also as illustrated in Figures 14 and 15. The hub 114 is connected to the hub 111 by the pin 115 that extends into the arcuate slot 113, so that although both arms start to move at the same time, the cable carrying arm 108 continues to move after the hub 114 stops.

Figure 31:
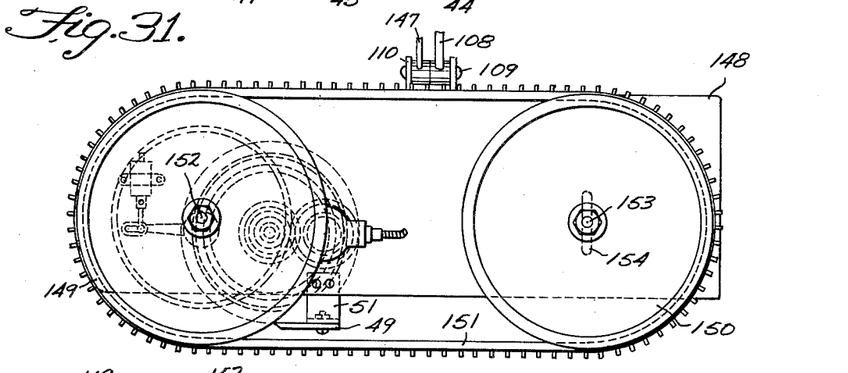
Figure 31 is a view illustrating a modification wherein a caterpillar tread is provided on the mower.
Figure 32:
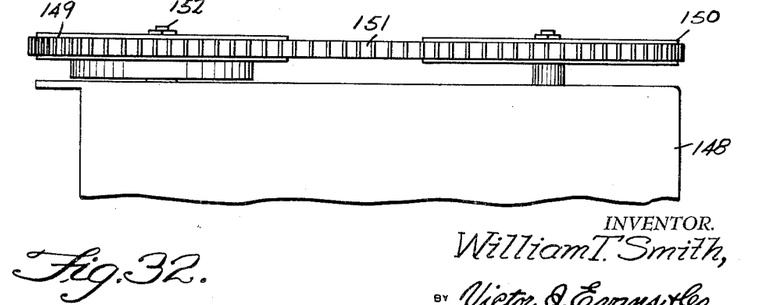
Figure 32 is a plan view showing the caterpillar tread on one side of the mower with parts broken away.

In the design shown in Figures 31 and 32 the mower casing 148 similar to the casing 40 is mounted on wheels 149 at the front and 150 at the rear and caterpillar treads 151 are provided on the wheels to provide greater traction. The wheels 149 are mounted on pins 152 similar to the pins 93 and the wheels 150 are mounted on the side walls of the casing by shafts 153 in slots 154 which provide vertical adjustment for the tread.

Figure 30:
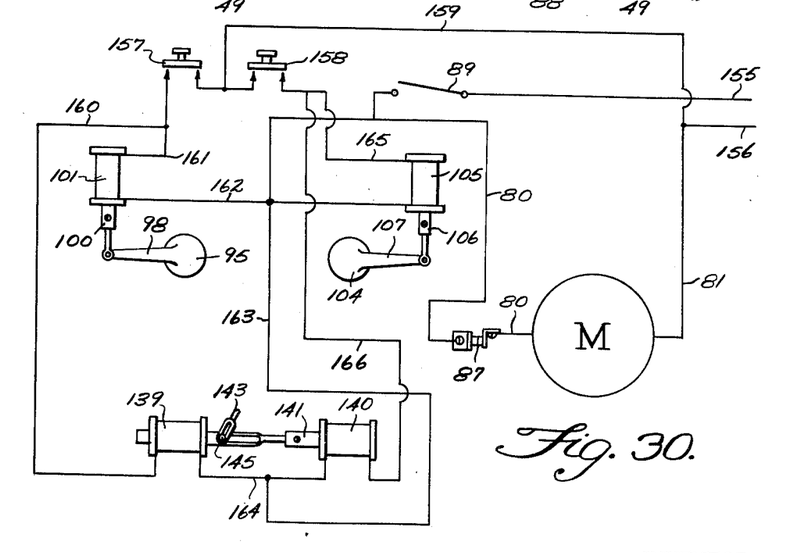
Figure 30 is a wiring diagram illustrating the circuits of the mower.

It will be noted in the wiring diagram shown in Figure 30 that current is supplied to the mower through wires 155 and 156 and the switch 89 and also switches 157 and 158 are positioned on a control panel and connected to the elements by suitable wires. The wire 155 is connected to the switch 89 and the wire 156 is connected to the wire 81 of the motor and to the switches 157 and 158 by a wire 159. The switch 157 closes the circuit to the solenoids 101 and 139 through wires 160 and 161, and the solenoids are connected back to the circuit through the switch 89 to which they are connected by wires 162, 163, and 164, and as the switch 157 is closed the solenoid 101 will stop the wheel and the solenoid 139 will throw the cable arm 108 over to the other side of the mower. The switch 158 is similarly connected to the solenoids 105 and 140 by wires 165 and 166.

With this arrangement of elements the lawn mower may be operated from a remote point wherein it will follow a straight course or turn around corners or around plants and the like, and the cable will be thrown from side to side so that it will not be cut by the cutters.

It will be understood that modifications may be made in the design and arrangement of the parts without departing from the spirit of the invention.

I claim:

1. An electrically operated lawn mower comprising a drum having cutter blades on the peripheral surface thereof, a casing, means rotatably mounting the drum in the casing, a stationary blade carried by the casing and positioned to coact with the blades on the drum, wheels rotatably mounted on the casing for supporting the casing and cutting blades in spaced relation above the ground, and means driving the wheels rotatably mounted on the casing by the motor.

2. An electrically operated lawn mower comprising a drum having cutter blades on the peripheral surface thereof, a casing, means rotatably mounting the drum in the casing, a stationary blade carried by the casing and positioned to coact with the blades on the drum, wheels rotatably mounted on the casing for supporting the casing and cutting blades in spaced relation above the ground, and said motor having an armature shaft with extended ends, and friction elements on the extended ends of the armature shaft, positioned in the wheels rotatably mounted on the casing for frictionally driving the said wheels.

3. In an electrically operated lawn mower the combination which comprises a drum having cutter blades on the peripheral surface, a casing, means rotatably mounting the drum in the casing, a stationary blade carried by the casing and positioned to coact with the blades on the drum, wheels rotatably and eccentrically mounted in the casing for supporting the casing and cutting blades in spaced relation above the ground, a motor positioned in the drum for rotating the drum and cutter blades and having an armature shaft with extended ends, said extended ends of the armature shaft having friction elements thereon positioned in the wheels of the casing for frictionally driving said wheels, means actuating the wheels independently to engage or disengage the said friction driving elements, and a current supplying cable extended from the casing.

4. In an electrically operated lawn mower the combination which comprises a drum having cutter blades on the peripheral surface, a casing, means rotatably mounting the drum in the casing, a stationary blade carried by the casing, and positioned to coact with the blades on the drum, wheels rotatably and eccentrically mounted in the casing for supporting the casing and cutting blades in spaced relation above the ground, an inner sleeve slidably mounted in the drum, a motor positioned in the said inner sleeve for rotating the drum and cutter blades, and having an armature shaft with extended ends, said extended ends of the armature shaft having friction elements thereon positioned in the wheels of the casing for frictionally driving said wheels, means actuating the wheels independently to engage or disengage the said friction driving elements, and a current supplying cable extended from the mower, said inner sleeve providing a slip movement for breaking a circuit to the motor when the cutting blade strikes an obstruction.

5. In an electrically operated lawn mower the combination which comprises a drum having cutter blades on the peripheral surface, a casing, means rotatably mounting the drum in the casing, a stationary blade carried by the casing, and positioned to coact with the blades on the drum, wheels rotatably and eccentrically mounted in the casing for supporting the casing and cutting blades in spaced relation above the ground, a motor positioned in the drum for rotating the drum and cutter blades and having an armature shaft with extended ends, said extended ends of the armature shaft having friction elements thereon positioned in the wheels of the casing for frictionally driving said wheels, means actuating the wheels independently to engage or disengage the said friction driving elements, and means feeding the cable through the machine as the mower travels over the ground.

6. In an electrically operated lawn mower the combination which comprises a drum having cutter blades on the peripheral surface, a casing, means rotatably mounting the drum in the casing, a stationary blade carried by the casing, and positioned to coact with the blades on the drum, wheels rotatably and eccentrically mounted in the casing for supporting the casing and cutting blades in spaced relation above the ground, a motor positioned in the drum for rotating the drum and cutter blades and having an armature shaft with extended ends, said extended ends of the armature shaft having friction elements thereon positioned in the wheels of the casing for frictionally driving said wheels, means actuating the wheels independently to engage or disengage the said friction driving elements, a cable carrying arm pivotally mounted on the casing, means feeding the cable through the outer end of the arm, and means actuating the arm from one side of the casing to the other from a remote point.

7. In an electrically operated lawn mower, the combination which comprises a drum having cutter blades on the peripheral surface thereof, a casing, means rotatably mounting the drum in the casing, a stationary blade carried by the casing and positioned to coact with the blades on the drum, wheels having substantially hollow drums on the inner surfaces rotatably and eccentrically mounted on the casing for supporting the casing and cutting blades in spaced relation above the ground, a motor positioned in the drum for rotating the drum and cutter blades, said motor having an armature shaft with extended ends and having friction elements on the said extended ends positioned in the drums of the wheels of the casing, means actuating the wheels independently wherein the drums on the inner surfaces thereof engage and disengage the said friction means of the motor armature shaft, brake shoes positioned in the hubs of the wheels, means actuating the brake shoes to hold the wheels independently, a current supplying cable extended from the casing, a cable carrying arm pivotally mounted on the casing, means actuating the arm toward either side of the casing, and cable feeding means in the outer end of the said arm.

8. In an electrically operated lawn mower, a housing having driving wheels with inwardly extending hubs at the forward end and casters supporting the rear end, a transversely positioned armature shaft fixedly mounted in the housing with the ends thereof extending into the hubs of the driving wheels, an armature on said shaft, an inner cylindrical housing with extending hubs journaled on said armature shaft and carrying the field elements of the armature providing a motor, friction bushings on the ends of the extending hubs of the inner cylinder positioned to contact the inner surfaces of the hubs of the driving wheels, brake shoes mounted on the housing, extending into the hubs of the driving wheels, and positioned to be contacted by the inner surfaces of said hubs, means eccentrically mounting the driving wheels on the housing, solenoids for actuating the eccentric mountings to move the wheels and hubs thereof to disengage the friction bushings and engage the brake shoes, a cutter cylinder with cutters on the peripheral surface slidably mounted on the inner cylinder, a blade positioned to coact with the said cutters, a cable carrying arm, and solenoids positioned to throw the cable carrying arm from one side of the machine to the other.

9. In a mower as described in claim 8, means resiliently holding the cutter cylinder on the inner cylinder, and means actuating the cylinders to break the circuit to the motor as the cutters engage an obstruction.

10. In a mower as described in claim 8, means in the outer end of the cable carrying arm for feeding a cable therethrough as the mower travels.

WILLIAM T. SMITH.

REFERENCES CITED

The following references are of record in the file of this patent:

UNITED STATES PATENTS

| Number | Name | Date |
|---|---|---|
| 1,461,323 | Peters | July 10, 1923 |
| 1,490,127 | Peters | Apr. 15, 1924 |
| 1,812,272 | Steinmetz et al. | June 30, 1931 |
| 2,097,351 | Smith | Oct. 26, 1937 |